US009261110B2

(12) United States Patent
Buzzi

(10) Patent No.: US 9,261,110 B2
(45) Date of Patent: Feb. 16, 2016

(54) BALANCING DEVICE, PARTICULARLY FOR TURBOCOMPRESSORS, AND CORRESPONDING METHOD

(71) Applicant: Carlo Buzzi, Mandello Del Lario (IT)

(72) Inventor: Carlo Buzzi, Mandello Del Lario (IT)

( * ) Notice: Subject to any disclaimer, the term of this patent is extended or adjusted under 35 U.S.C. 154(b) by 289 days.

(21) Appl. No.: 13/856,488

(22) Filed: Apr. 4, 2013

(65) Prior Publication Data

US 2013/0263437 A1 Oct. 10, 2013

(30) Foreign Application Priority Data

Apr. 6, 2012 (IT) .............................. MI2012A0564

(51) Int. Cl.
*F04D 29/66* (2006.01)
*B23Q 3/00* (2006.01)

(52) U.S. Cl.
CPC ............... *F04D 29/662* (2013.01); *B23Q 3/00* (2013.01); *Y10T 29/4932* (2015.01); *Y10T 29/49998* (2015.01)

(58) Field of Classification Search
CPC ... B23Q 3/00; F04D 29/662; Y10T 29/49998; B23B 31/265; B23B 31/003; B23B 2231/20; H02K 7/04; F05D 2260/15
See application file for complete search history.

(56) References Cited

U.S. PATENT DOCUMENTS

2008/0289416 A1* 11/2008 Thelen ............................ 73/471

FOREIGN PATENT DOCUMENTS

| DE | 102005053786 A1 | 5/2007 |
| DE | 102009008955 A1 | 8/2010 |
| DE | 102010036954 A1 | 2/2012 |

* cited by examiner

*Primary Examiner* — Moshe Wilensky
(74) *Attorney, Agent, or Firm* — Cantor Colburn LLP

(57) ABSTRACT

A balancing device, particularly for turbocompressors, comprising a base structure which supports elastically a supporting structure which has a flange for supporting a receptacle of a rotating element and a rotating element, wherein the rotating element can move with a rotary motion about its own rotation axis; actuation elements being adapted to actuate lever elements along a substantially radial direction; the lever elements being adapted to generate a force for fixing the receptacle of the rotating element to the supporting flange in a direction that is substantially parallel to the rotation axis.

8 Claims, 3 Drawing Sheets

BALANCING DEVICE, PARTICULARLY FOR TURBOCOMPRESSORS, AND CORRESPONDING METHOD The present invention relates to a balancing device, particularly for turbocompressors.

BACKGROUND OF THE INVENTION

Balancing devices of the known type provide for dynamic measurement of the imbalance of a rotating element mounted in its own receptacle, complete with bearings, and turned at the service rate. The rotating element can be for example a wheel or a rotor.

The normal balancing method requires measuring the vibrations at one or more rotation rates in a certain measurement range, for example between 20,000 rpm and 200,000 rpm.

Known balancing machines of the "supercritical" or "soft bearing" type provide said measurement of the vibrations by turning the rotating element in what are called supercritical conditions, i.e., so that the resonance frequencies generated by the elastic elements that support the support complete with the rotating element and its receptacle are substantially lower than the vibration measurement range.

In balancing machines of the known type, the rotating element, complete with its receptacle that supports the bearings, is mounted on a support that is connected to the base structure of the machine in a relatively elastic manner, so as to ensure a resonance in all its vibration modes outside the speed of use of the system under the selected measurement conditions. Vibration measurement is performed generally by means of a sensor, for example an accelerometer, which is fixed to the vibrating part of the balancing machine. The extent of the measured vibration, with equal actual imbalances of the rotating element, depends on the mass and on the moment of inertia of the vibrating part of the balancing machine.

It follows that a drawback of balancing machines of the known type relates to the fact that this mass is often substantial, and this entails the considerable reduction of the measured value of the vibrations.

In particular, in known balancing devices the fixing of the receptacle and of the rotating element to the corresponding supporting structure is a very critical aspect for good vibration measurement. Very rigid fixing is in fact indispensable in order to prevent the rotating element and its receptacle from deforming or detaching from the supporting structure due to the dynamic forces in play, causing unwanted resonances or non-linearities of vibration measurement.

Currently, various techniques and various devices are known for fixing a rotating element and corresponding receptacle to a balancing device and will be described hereinafter together with the related drawbacks.

It is known, for example, to fasten the receptacle of the rotating element to the corresponding supporting structure by means of bolts. However, a drawback of this solution relates to the time required to perform, manually, the fixing operation; the long time required to perform fixing is in fact not compatible with the production times of the facilities in which balancing machines operate.

Solutions for fixing the receptacle of the rotating element are also known which use hydraulic actuators, or actuators of another type, capable of providing well-controlled fixing forces to the supporting structure, and in a direction that is parallel to the rotation axis of the rotating element. However, these actuators have the drawback of being bulky and of having a considerable mass, and since they are mounted on the vibrating part of the balancing machine they entail the considerable and undesirable increase of the oscillating mass. The increase of the oscillating mass is a very undesirable drawback, because it entails the modification of the vibration mode of the vibrating part on which the vibrations caused by the rotating element are measured. In particular, the increase in mass causes a sharp reduction in the measured vibration, reducing therefore the sensitivity of the measurement system. Moreover, the addition of mechanical components on the vibrating part increases the likelihood of adding vibrating modes in the range of useful frequencies of the measurement, introducing new resonances that are harmful for the quality of the measurement.

Radial cylindrical actuators are also known which are opposite to the receptacle of the rotating element and bear simple V-shaped blocks that fasten the supporting structure, for example a supporting ring, to the receptacle of the rotating element. However, this known fixing system has the drawback that it can be used only for some appropriate shapes of the fixing part of the receptacle. Another drawback resides in that this system cannot provide a known and controllable axial fastening force, due to the friction inside the V-shaped block itself, which is pressed only radially.

SUMMARY OF THE INVENTION

The aim of the present invention is to provide a balancing device that solves the technical problems, obviates the drawbacks illustrated above and overcomes the limitations of the background art, allowing accurate measurements of the imbalance of a rotating element.

Within this aim, an object of the present invention is to provide a balancing device that does not affect the vibrating mass.

Another object of the invention is to provide a balancing device that allows fastening the receptacle of a rotating element with a controllable force.

Another object of the invention is to provide a balancing device that has a reduced effect on the supercritical vibration mode of the system.

A further object of the invention is to provide a balancing device that is capable of giving the greatest assurances of reliability and safety of use.

Another object of the invention is to provide a balancing device that is easy to provide and economically competitive in comparison to the background art.

This aim and these and other objects that will become more apparent hereinafter are achieved by a balancing device, particularly for turbocompressors, comprising a base structure that supports elastically a supporting structure provided with a flange for supporting a receptacle of a rotating element and a rotating element, said rotating element being movable with a rotary motion about its own rotation axis, characterized in that it comprises actuation means adapted to actuate lever means along a substantially radial direction, said lever means being adapted to generate a force for fixing said receptacle to said flange in a direction that is substantially parallel to said rotation axis.

BRIEF DESCRIPTION OF THE DRAWINGS

Further characteristics and advantages of the invention will become more apparent from the description of a preferred but not exclusive embodiment of a balancing device, illustrated by way of non-limiting example with the aid of the accompanying drawings, wherein.

DESCRIPTION OF THE PREFERRED EMBODIMENTS

Figure 1:
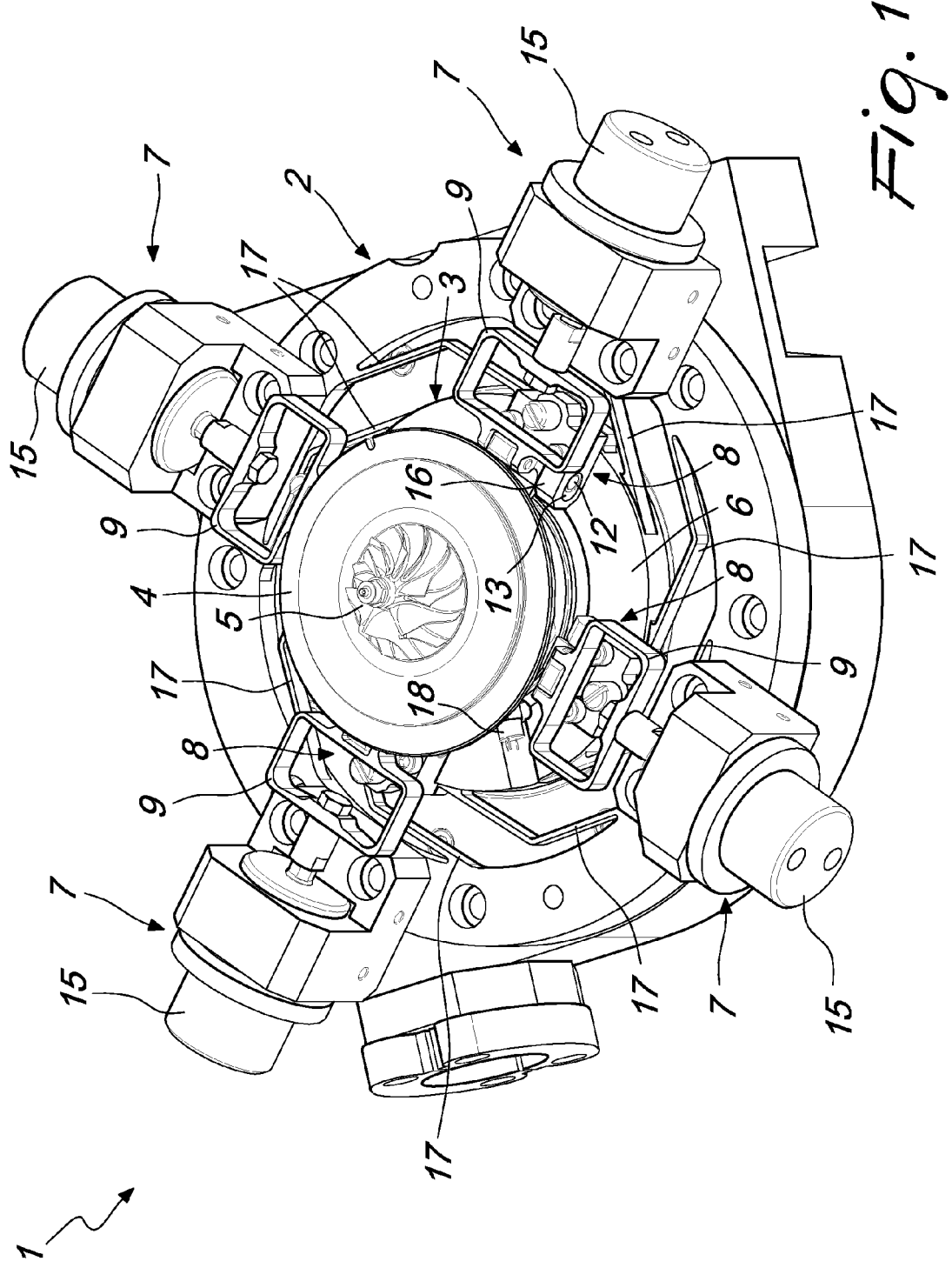
FIG. 1 is a perspective view of an embodiment of a balancing device according to the invention.

With reference to the cited figures, the balancing device, particularly for turbocompressors, generally designated by the reference numeral 1, comprises a base structure 2 that supports elastically a supporting structure 3, for example by means of a plurality of supporting springs 17. The supporting structure 3 has a flange 6 for supporting a receptacle 4 of a rotating element 5, which contains the rotating element 5 itself. The receptacle 4 is generally complete with bearings. The rotating element 5 is movable with a rotary motion about its own rotation axis. The supporting structure 3 constitutes, together with the receptacle 4 and the rotating element 5, the vibrating part of the balancing device 1, to which the sensors for measuring vibration, such as accelerometers 18, are applied.

According to the invention, the balancing device 1 comprises actuation means 7 adapted to actuate lever means 8 along a substantially radial direction. These lever means 8 are adapted to generate a force for fixing the receptacle 4 to the flange 6 of the supporting structure, in a direction that is substantially parallel to the rotation axis of the rotating element 5 itself.

The balancing device is advantageously adapted for the balancing of turbocompressors for motor use, driven by exhaust gas. In this case, the parts adapted to convey the air for driving the rotating element are suitably connected, or simply kept near, to the supporting structure 3, so as to not increase, or increase only minimally, the vibrating mass of the balancing device.

Advantageously, elastic elements 9 are comprised between the actuation means 7 and the lever means 8 and act in a substantially radial direction, in accordance with the actuation direction of the actuation means 7, and are adapted to uncouple mechanically said actuation means 7 from the lever means 8. These elastic means 9 can be constituted by metallic springs or by elastomeric elements.

The actuation means 7 are constituted advantageously by cylindrical actuators 15, which are fixed to the base structure 2 and therefore do not bear on the vibrating supporting structure 3.

The actuation means 7 can be mounted in pairs arranged on the same diameter, so as to cancel the radial component of the radial force generated by them. The accompanying figures show a balancing device 1 that has two opposite pairs of actuation means 7.

The lever means 8 have advantageously a shape according to which the power arm 10 to which the force exerted by the actuation means 7 is applied, in a radial direction, is longer than the resistance arm 11 that generates the force for fixing the receptacle 4 in a direction that is parallel to the rotation axis of the rotating element 5. In this manner, the axial force that can be obtained for fixing the receptacle 4 to the flange 6 is greater than the force provided by the actuation means 7 in a radial direction.

The lever means 8 are advantageously adapted to perform a translational motion in a radial direction and to rotate on a plane that passes through the rotation axis of the rotating element 5.

In particular, the supporting structure 3 can comprise a portion 16 that defines a substantially elliptical slot 13 and the lever means 8 can comprise a pivot 12 (or vice versa). The pivot 12 engages the slot 13 so as to allow the translation and the rotation of the lever means 8. The pivot 12 in fact is free to perform a translational motion in a radial direction and to rotate inside the slot 13.

The balancing device 1 can comprise, moreover, retention means 14 which are interposed between the actuation means 7 and the lever means 8 and are adapted to delay the rotation of the lever means 8, facilitating, first of all, their translation in a radial direction.

The vibrating part of the balancing device 1, which is constituted by the supporting structure 3 provided with the flange 6, the receptacle 4 of the rotating element 5 and the rotating element 5 itself, is supported on the base structure 2 by various elastic elements, the effect of which adds up to form the elastic constant in the various directions of possible motion, responsible for the resonance frequencies of the rotating element 5 in its modes of vibration. These elastic elements are constituted by the supporting springs 17 of the supporting structure 3, by the elastic components 9 for uncoupling between the actuation means 7 and the lever means 8, and by the elastic gaskets 19 made of rubber. The balancing device 1 is such that all the elastic elements ensure a maximum resonance frequency of the vibrating part that is lower than the frequency from which one intends to measure vibration. The fact of making the lever means 8 amplify the force transmitted by the actuation means 7, by means of a system of levers, for the fixing of the receptacle 4 to the flange 6 allows keeping the elastic constant of the elastic components 9 low, so as to not stiffen the vibrating part of the device 1 and therefore not increase the resonance frequency.

The operation of the balancing device is described hereinafter.

The balancing method performed with the balancing device 1 according to the invention comprises the steps of:
   accommodating the receptacle 4 of the rotating element 5, which contains the rotating element 5 itself, at the flange 6 of the supporting structure 3, which is supported elastically by the base structure 2;
   translating the lever means 8 with the actuation means 7, which operate along a substantially radial direction;
   rotating the lever means 8, by means of the operation of the actuation means 7, where the lever means 8 generate a force for fixing the receptacle 4 to the flange 6 in a direction that is substantially parallel to the rotation axis of the rotating element 5.

Figure 2:
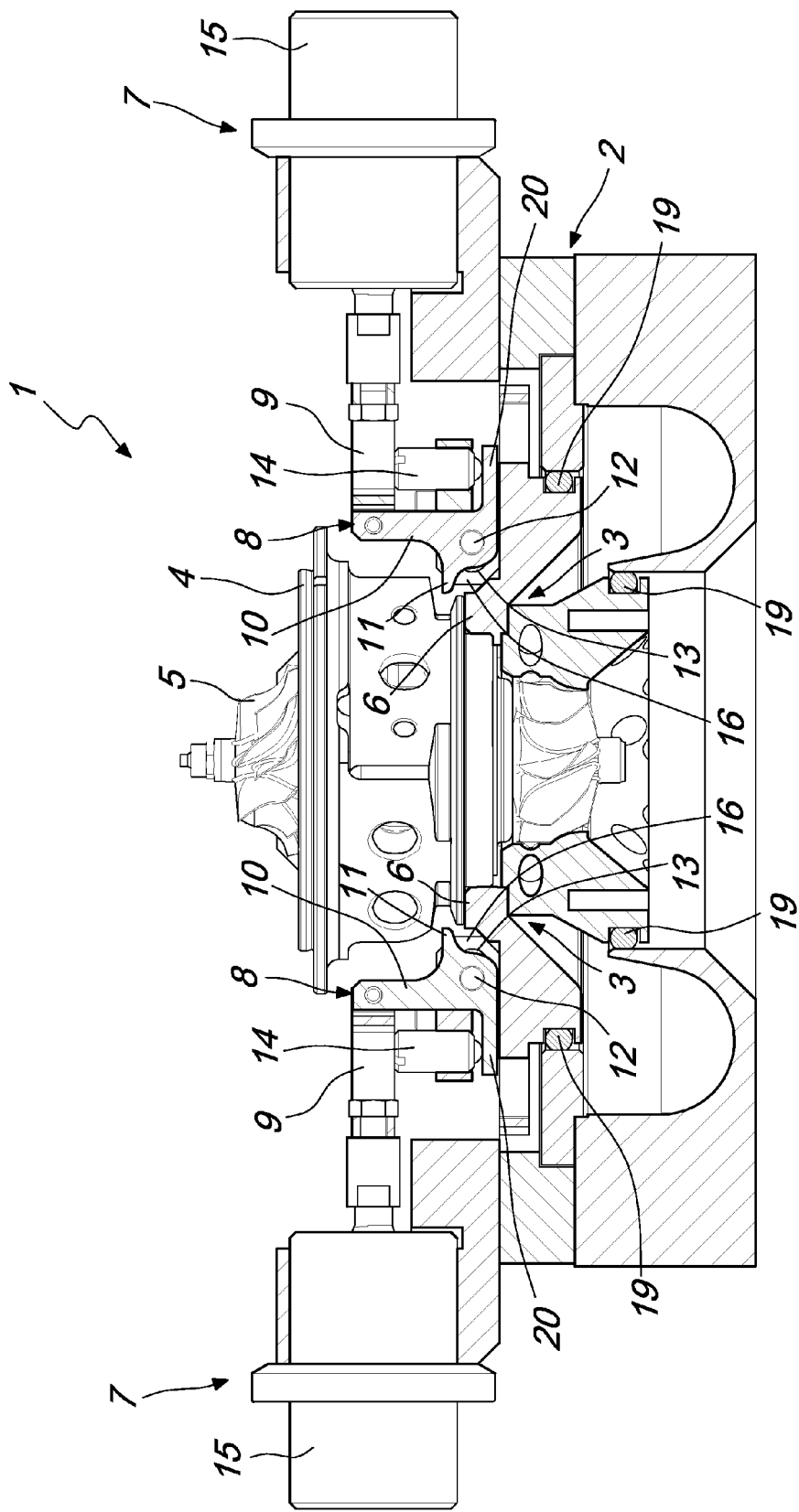
FIG. 2 is a sectional view of the balancing device of FIG. 1, according to the invention, in an open configuration.
Figure 3:
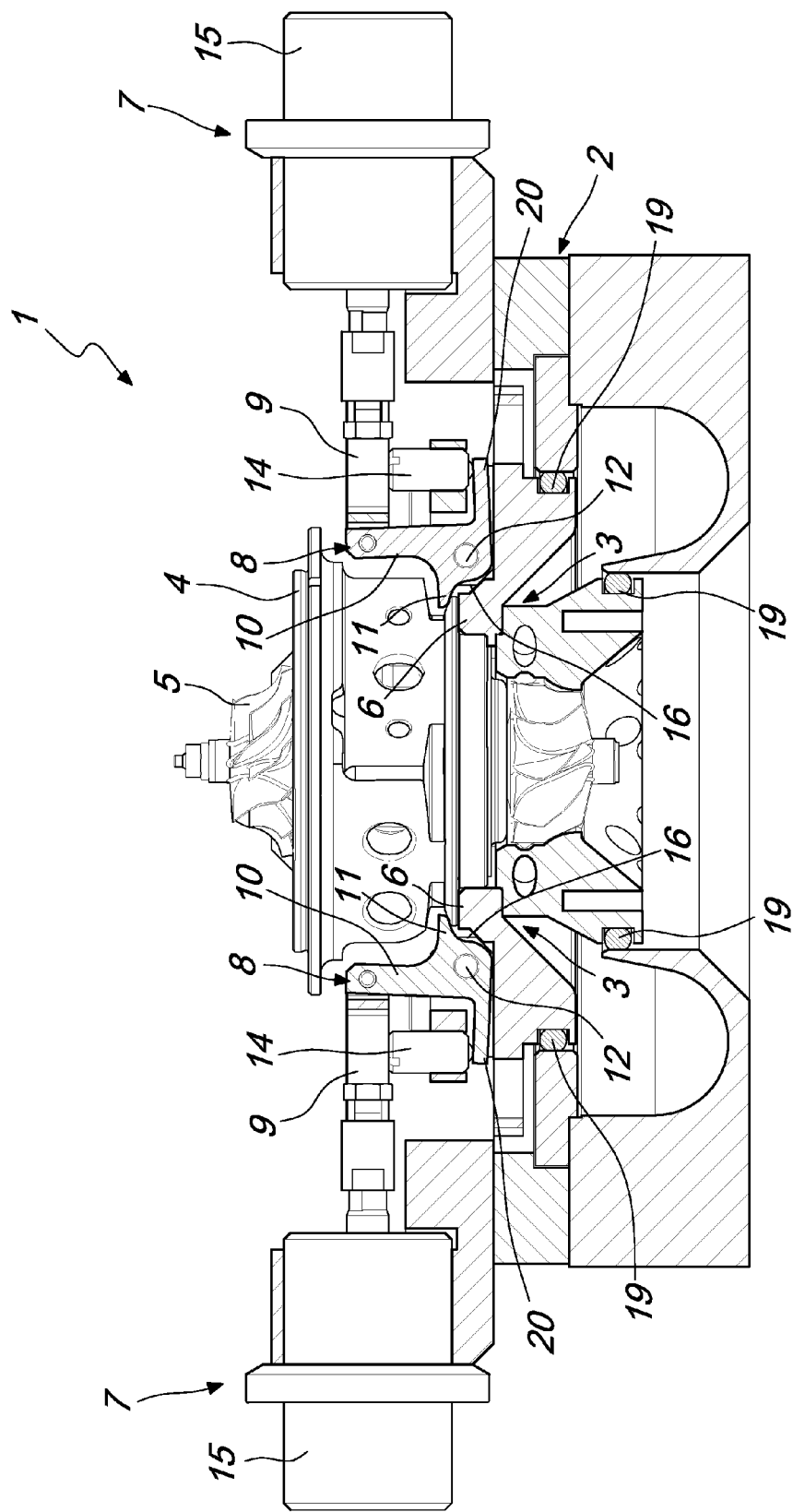
FIG. 3 is a sectional view of the balancing device of FIG. 1, according to the invention, in a fixing configuration.

In particular, as shown in FIGS. 2 and 3, which relate respectively to the balancing device 1 in the open configuration and in the fixing configuration, the actuation means 7, when activated, apply a thrust to the lever means 8, in a radial direction, causing their translation along the allowed stroke in a radial direction with respect to the pivot 12 in the elliptical slot 13. The translation of the lever means 8 in a radial direction allows loading and unloading the receptacle 4 and the rotating element 5 onto and from the balancing device 1.

In the initial step of radial thrust of the lever means 8 by the actuation means 7, the lever means 8 do not rotate but perform a translational motion due to the retention of the retention means 14, constituted for example by a spring system. As the radial thrust continues, when the pivot 12 reaches the end of the slot 13, the lever means 8 start to rotate, overcoming the elastic retention thrust applied by the retention means 14. In this manner, the lever means 8 apply a force for fixing the receptacle 4 against the flange 6 in a direction that is substantially parallel to the rotation axis of the rotating element.

As shown in FIGS. 2 and 3, the lever means 8 comprise a protrusion 20, which is directed toward the actuation means 7 and allows the retention means 14 to delay the rotation of the lever means 8, facilitating, at least in the initial radial thrust step, only their radial translation.

In the exemplifying case of a turbocompressor, said turbocompressor, after being fixed to the supporting structure as described, is turned at the measurement speed by means of compressed air, normally in the range of the normal operating speed. One or more vibration sensors, for example accelerometers 9, are used to measure the vibration of the vibrating suspended part. An angular position sensor is used, moreover, to detect synchronization between rotation of the rotating element 5 and vibration. This information is necessary in order to detect the imbalance correction position. Said sensor can be of the optical, magnetic or eddy-current type.

In practice it has been found that the balancing device, particularly for turbocompressors, according to the present invention, achieves the intended aim and objects, since it allows performing accurate measurements of the imbalance of a rotating element.

Another advantage of the balancing device, according to the invention, consists in providing a balancing device that does not affect the vibrating mass.

A further advantage of the balancing device, according to the invention, consists in allowing the fastening of the receptacle of a rotating element with a controllable force, limiting drastically or avoiding modifications to the vibration mode of the vibrating parts.

Another advantage of the balancing device, according to the invention, consists in having a reduced influence on the supercritical vibration mode of the system.

The balancing device thus conceived is susceptible of numerous modifications and variations, all of which are within the scope of the appended claims.

All the details may further be replaced with other technically equivalent elements.

In practice, the materials used, as long as they are compatible with the specific use, as well as the contingent shapes and dimensions, may be any according to the requirements.

The disclosures in Italian Patent Application No. MI2012A000564 from which this application claims priority are incorporated herein by reference.

What is claimed is:

1. A balancing device for turbocompressors comprising a base structure which supports elastically a supporting structure which has a flange for supporting a receptacle of a rotating element, the balancing device further comprising the rotating element, said rotating element being movable with a rotary motion about its own rotation axis, the balancing device further comprising actuation means adapted to actuate lever means along a substantially radial direction, said lever means being adapted to generate a force for fixing said receptacle to said flange in a direction which is substantially parallel to said rotation axis.

2. The balancing device according to claim 1, wherein elastic elements are disposed between said actuation means and said lever means, the elastic elements being elastic in a substantially radial direction and are adapted to uncouple mechanically said actuation means from said lever means.

3. The balancing device according to claim 2, wherein in said lever means a power arm to which the force of said actuation means is applied, in said substantially radial direction, is longer than a resistance arm that generates the force for fixing in said direction which is substantially parallel to said rotation axis.

4. The balancing device according to claim 1, wherein said lever means are adapted to perform a translational movement in a radial direction and to rotate on a plane that passes through said rotation axis.

5. The balancing device according to claim 4, wherein said supporting structure comprises a portion which forms a substantially elliptical slot, said lever means comprising a pivot which engages said slot to allow said translation and said rotation of said lever means.

6. The balancing device according to claim 1, further comprising retention means which are interposed between said actuation means and said lever means and are adapted to delay rotation of said lever means.

7. The balancing device according to claim 6, wherein said retention means are comprised between a protrusion of said lever means which is directed radially toward said actuation means and the actuation means themselves.

8. The balancing device according to claim 1, wherein said actuation means are mounted in pairs arranged on the same diameter.

* * * * *